US008010816B2

(12) United States Patent
Wong et al.

(10) Patent No.: US 8,010,816 B2
(45) Date of Patent: Aug. 30, 2011

(54) METHOD AND SYSTEM FOR REDUCING POWER CONSUMPTION OF ACTIVE WEB PAGE CONTENT

(75) Inventors: Carl K. Wong, Portland, OR (US); Adriaan Van De Ven, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 425 days.

(21) Appl. No.: 12/347,175

(22) Filed: Dec. 31, 2008

(65) Prior Publication Data
US 2010/0169681 A1    Jul. 1, 2010

(51) Int. Cl.
G06F 1/26     (2006.01)
G06F 1/00     (2006.01)
G06F 7/00     (2006.01)
G06F 17/00    (2006.01)
G06F 3/00     (2006.01)
G06Q 30/00    (2006.01)

(52) U.S. Cl. ....... 713/320; 713/300; 705/14.4; 707/607; 715/201; 715/205; 715/716; 715/760

(58) Field of Classification Search .......... 713/300, 713/320; 705/14.4; 707/607; 715/201, 205, 715/716, 760
See application file for complete search history.

(56) References Cited

U.S. PATENT DOCUMENTS

| 6,901,522 | B2 * | 5/2005 | Buch .............. 713/320 |
| 7,000,126 | B2 * | 2/2006 | Stanley ........... 713/320 |
| 2005/0076253 | A1 * | 4/2005 | Lu ................ 713/320 |

OTHER PUBLICATIONS

"Adblock Plus: Getting started with Adblock Plus", retrieved from http://adblockplus.org/en/getting_started on Feb. 2, 2009; 4 pages.

* cited by examiner

*Primary Examiner* — Stefan Stoynov
(74) *Attorney, Agent, or Firm* — Barnes & Thornburg, LLP

(57) ABSTRACT

A method and system for reducing power consumption of active web page content includes identifying those threads associated with active advertisement components of the web page and synchronizing the wakeup periods of such threads such that the total number of wakeups over a given period is reduced.

20 Claims, 2 Drawing Sheets

METHOD AND SYSTEM FOR REDUCING POWER CONSUMPTION OF ACTIVE WEB PAGE CONTENT

BACKGROUND

A browser or web browser is a software application used on a computing device to view web pages and other online content, which is downloaded from a remote source over the Internet and/or other networks. Web pages may contain a variety of components such as text, banner advertisements, video, etc. Some of the web page components may be static (e.g., text) and other web page components may be active (e.g., an advertisement with animation or a video). Additionally, the web pages may contain primary content requested by the user and other non-requested content such as advertisements. Some advertisements may be active and include animation or motion, sound, and/or other active features. Such active advertisements may require continual attention from the processor of a computing device, which causes significant and repetitive bursty activity on the device. The intense, repetitive activity required to manage the active advertisements may reduce the effectiveness of any power-save state or mode usable by the processor of the computing device.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
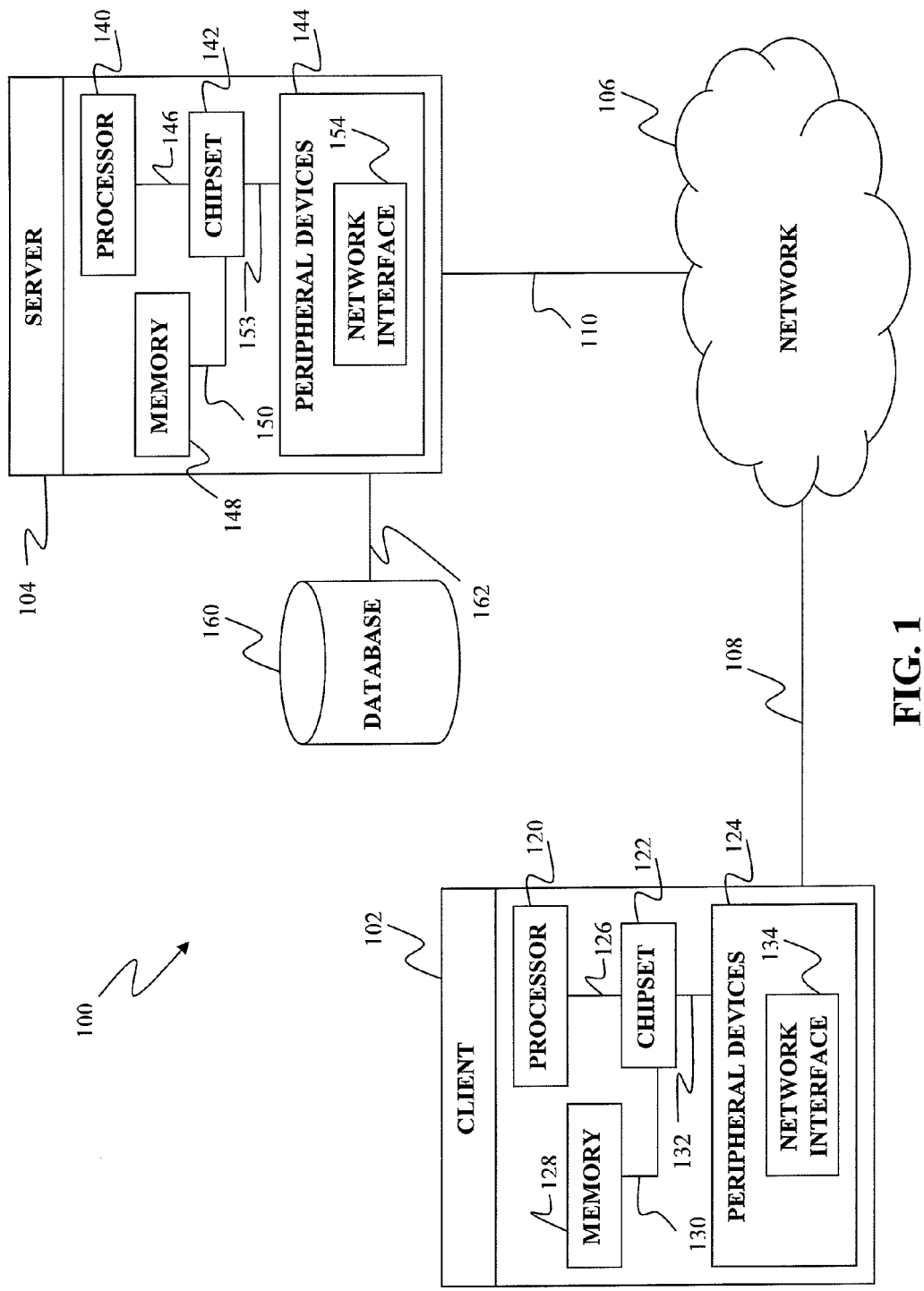
FIG. 1 is a simplified diagram of one embodiment of a system for reducing power consumption of active web page content.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, in one embodiment, a system 100 for reducing power consumption of active web page content includes a client computer 102, a server computer 104, and a network 106. The client 102 is communicatively coupled to the network 106 via a communication link 108. Similarly, the server 104 is communicatively coupled to the network 106 via a communication link 110. The communication links 108, 110 may be embodied as any type and number of communication links capable of facilitating communication between the computers 102, 104 and the network 106. For example, the communication links 108, 110 may be embodied as or otherwise include any number of wires, cables, wireless connections, and/or other interconnect. The network 106 may be embodied as or otherwise include any type of network including a local area network (LAN), a wide area network (WAN), or a globally-accessible public network such as the Internet. Additionally, the network 106 may include any number of intervening communication links and devices such as routers, switches, hubs, and other intervening computers.

In the illustrative embodiment of FIG. 1, the client 102 includes a processor 120, a chipset 122, and a plurality of peripheral devices 124. The client 102 may be embodied as any type of computing device such as, for example, a desktop computer system, a laptop computer system, or a handheld computing device. The illustrative processor 120 is a single core processor. However, in other embodiments, the processor 120 may be embodied as a multi-processor having any number of processor cores. Additionally, the client computer 102 may include additional processors having one or more processor cores.

The processor 120 is communicatively coupled to the chipset 122 via a number of signal paths 126. The signal paths 126 may be embodied as any type of signal paths capable of facilitating communication between the processor 120 and the chipset 122. For example, the signal paths 126 may be embodied as any number of wires, printed circuit board traces, via, bus, intervening devices, and/or the like. The chipset 122 may include a memory controller hub (MCH) or northbridge, an input/output controller hub (ICH) or southbridge, and a firmware device. In such embodiments, the firmware device may be embodied as a memory storage device for storing Basic Input/Output System (BIOS) data and/or instructions and/or other information.

The chipset 122 is communicatively coupled to a memory device 128 via a number of signal paths 130. Similar to the signal paths 126, the signal paths 130 may be embodied as any type of signal paths capable of facilitating communication between the chipset 122 and the memory device 128 such as, for example, any number of wires, printed circuit board traces, via, bus, intervening devices, and/or the like. The memory devices 128 may be embodied as dynamic random access memory devices (DRAM), synchronous dynamic random access memory devices (SDRAM), double-data rate dynamic random access memory device (DDR SDRAM), and/or other volatile memory devices. Additionally, although only a single memory device is illustrated in FIG. 1, in other embodiments, the client computer 102 may include additional memory devices.

The chipset 122 is also communicatively coupled to the plurality of peripheral devices 124 via signal paths 132. Again, similar to the signal paths 126, 130, the signal paths 132 may be embodied as any type of signal paths capable of facilitating communication between the chipset 122 and the peripheral devices 124 such as, for example, any number of wires, printed circuit board traces, via, bus, intervening devices, and/or the like. The peripheral devices 124 may include any number of peripheral devices including data storage devices, interfaces, and output devices. For example, as illustrated in FIG. 1, the peripheral devices may include a network interface 134 configured to facilitate communication between the client computer 102 and the network 106. Additionally, the peripheral devices 124 may include any number of other devices such as, for example, a keyboard, a display, a hard disk, a mouse, and/or the like. The particular devices included in the peripheral devices 124 may depend upon, for example, the intended use of the computing device. Further, it should be appreciated that the client computer 102 may include other components, sub-components, and devices not illustrated in FIG. 1 for clarity of the description.

Similar to the client computer 102, the server computer 104 includes a processor 140, a chipset 142, and a plurality of peripheral devices 144. The processor 140 may be a single core or multiple core processor. In embodiments wherein the processor 140 is embodied as a multiple core processor, the processor 140 may include any number of processor cores. Additionally, the server computer 104 may include additional processors having one or more processor cores.

The processor 140 is communicatively coupled to the chipset 142 via a number of signal paths 146. The signal paths 146 may be embodied as any type of signal paths capable of facilitating communication between the processor 140 and the chipset 142. For example, the signal paths 146 may be embodied as any number of wires, printed circuit board traces, via, bus, intervening devices, and/or the like. The chipset 142 may include a memory controller hub (MCH) or northbridge, an input/output controller hub (ICH) or southbridge, and a firmware device. In such embodiments, the firmware device may be embodied as a memory storage device for storing Basic Input/Output System (BIOS) data and/or instructions and/or other information.

The chipset 142 is communicatively coupled to a memory device 148 via a number of signal paths 150. Similar to the signal paths 146, the signal paths 150 may be embodied as any type of signal paths capable of facilitating communication between the chipset 142 and the memory device 148 such as, for example, any number of wires, printed circuit board traces, via, bus, intervening devices, and/or the like. The memory devices 148 may be embodied as dynamic random access memory devices (DRAM), synchronous dynamic random access memory devices (SDRAM), double-data rate dynamic random access memory device (DDR SDRAM), and/or other volatile memory devices. Additionally, although only a single memory device is illustrated in FIG. 1, in other embodiments, the server computer 104 may include additional memory devices.

The chipset 142 is also communicatively coupled to the plurality of peripheral devices 144 via signal paths 152. Again, similar to the signal paths 146, 150, the signal paths 152 may be embodied as any type of signal paths capable of facilitating communication between the chipset 142 and the peripheral devices 154 such as, for example, any number of wires, printed circuit board traces, via, bus, intervening devices, and/or the like. The peripheral devices 154 may include any number of peripheral devices including data storage devices, interfaces, and output devices. For example, as illustrated in FIG. 1, the peripheral devices may include a network interface 154 configured to facilitate communication between the server computer 104 and the network 106. Additionally, the peripheral devices 144 may include any number of other devices such as, for example, a keyboard, a display, a hard disk, a mouse, a keyboard-video-mouse switch, and/or the like. Additionally, it should be appreciated that the server computer 104 may include other components, sub-components, and devices not illustrated in FIG. 1 for clarity of the description.

The server computer 104 is also communicatively coupled to a database 160 via a communication link 162. Although the database 160 is illustrated in FIG. 1 as separate from the server computer 104, the database 160 may form a portion of the server 104 in some embodiments. As such, the database 160 may be embodied as a physical storage device such as a hard drive and/or non-physical items such as a collection of files and other data. For example, in some embodiments, the database 160 or a portion thereof may be stored in the memory devices 148 of the server 104.

The database 160 has stored therein a set of pattern matching rules for identifying which components of a web page is an advertisement component. In one embodiment, the pattern matching rules include regular expressions, which are applied to or otherwise compared against the uniform resource locators (URLs) associated with the various web page components to determine whether such components are likely advertisements as discussed in more detail below. The pattern matching rules may also include keywords such as phrases or partial phrases. Additionally, the pattern of matching rules may include complete or partial uniform resource locators (URLs) of known advertisement sources. The database 160 may be continually updated and stored on the server computer 104.

Figure 2:
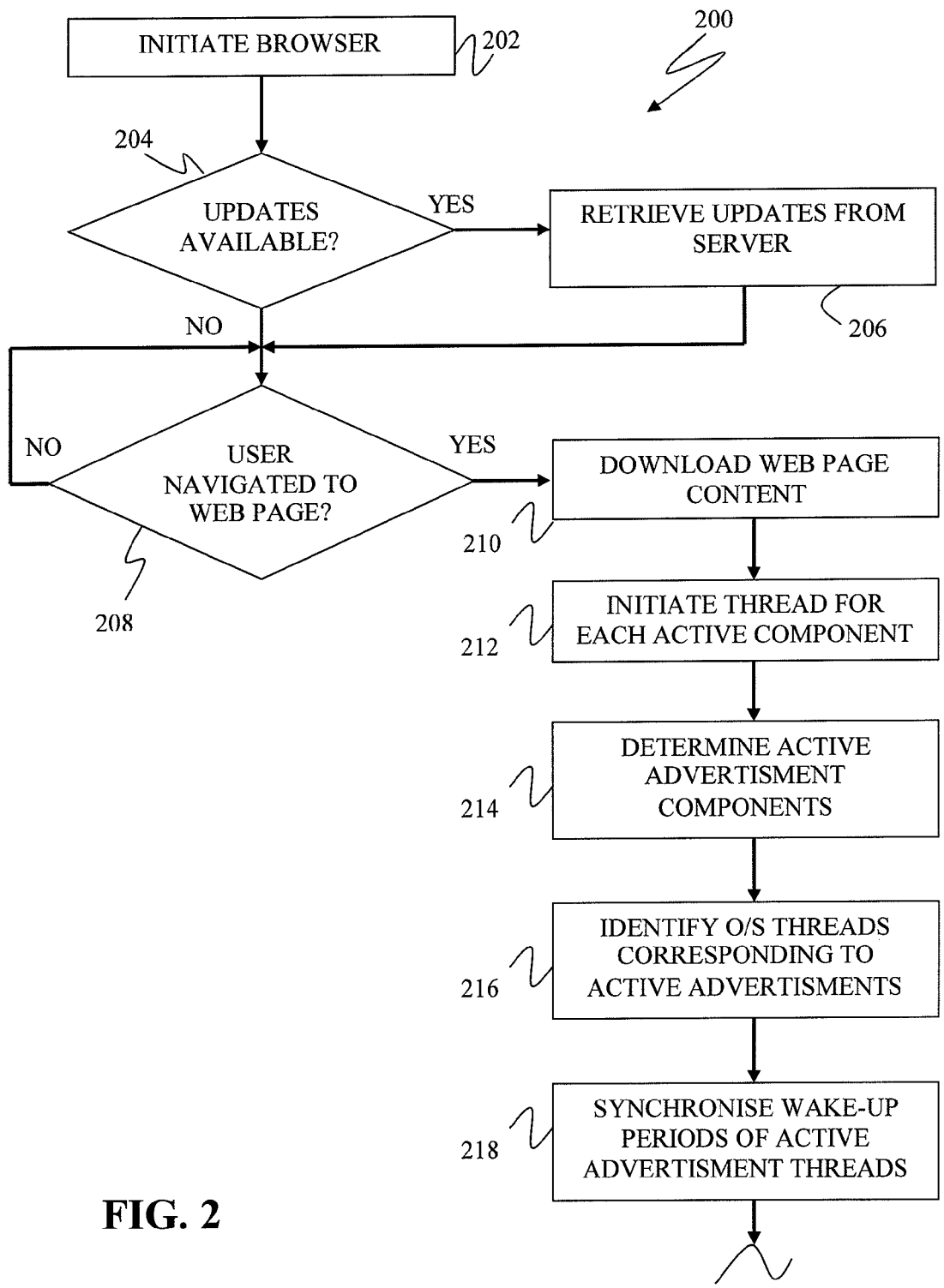
FIG. 2 is a simplified diagram of one embodiment of a method for reducing power consumption of active web page content.

In use, the client computer 102 may execute a method 200 for reducing the power consumption of active web page content as illustrated in FIG. 2. The method 200 begins with a block 202 in which a web browser is initiated on the client computer 102. The client 102 may initiate the web browser in response to an action of the user. For example, the user may select an icon or provide a similar instruction to the computer 102 to start the web browser. After the web browser has been initiated in block 202, the client 102 determines whether any updates to the pattern matching rules used to identify the advertisement content of web pages are available. The client 102 may be configured to check for updates periodically such as at every start-up or at specified time intervals. To check for updates, the client 102 communicates with the server 104 over the network 106. If updates are available, the client 102 downloads the updates from the server 104 in block 206. As discussed above, the set of pattern matching rules are used to identify which active components of the web page are advertisements. The pattern matching rules may be embodied as regular expressions, complete or partial uniform resource locators, addresses, and/or keywords or phrases that identify known sources of advertisements. As discussed in more detail below, the pattern matching rules are compared against a uniform resource locator associated with the active components of the web page.

In block 208, the client 102 determines whether the user has navigated to a web page using the browser. If so, the web page content is downloaded to the client 102 over the network 106 in block 210. The web page may contain a plurality of different components. Each component may include different content. For example, one web page component may contain text. Another web page component may contain a banner advertisement and a further web page component may contain a video. Each web page component has an associated uniform resource locator (URL) which identifies the address of the source from which the content of that particular component is retrieved. Because each component may have different content, the URLs of the components are typically not identical.

Some of the web page components may be active. Active web page components are those components that are non-static. Active web page components may include motion, animation, and/or sound. Some active web page components may be primary content that has been requested by the user (e.g., a video). Other active web page components may be active advertisements (i.e., an advertisement having motion, animation, and/or sound).

In block 212, the operating system of the client 102 initiates a separate thread for each active component of the web page. Each thread includes an associated wakeup period. The wakeup period identifies how often the processor 120 of the client 102 must manage that particular thread. For example, a thread may have a wakeup period of 10 milliseconds, which requires the processor 120 to manage that thread (e.g., manage the motion of an active advertisement) every 10 milliseconds. The lower the wakeup period, the more wakeups that particular thread causes over a given period of time.

As discussed above, some of the active components may be advertisements. As such, in block 214, those active components corresponding to advertisements are determined. To do so, the client 102 compares the uniform resource locator (URL) associated with each active component with each pattern matching rule that was downloaded in block 206. If a match is found, the client 102 identifies that particular active component as an advertisement (i.e., an active advertisement). As discussed above, the pattern matching rules may be embodied as regular expressions, complete or partial URLs, and/or keywords or phrases. For example, a partial URL may be used to identify all content coming from a particular domain or computer as advertisements.

In block 216, each operating system thread associated with one of the active advertisement components is identified. As discussed above, each thread has an associated wakeup period. In block 218, the wakeup period for those threads identified as being associated with active advertisement components are synchronized. To do so, in one embodiment, a minimum wakeup period may be determined and the wakeup period for each thread may be rounded up to the nearest multiple of the minimum wakeup period. For example, in one embodiment, the predetermined minimum wakeup period may be set to 10 milliseconds. If so, the wakeup period for each thread associated with an active advertisement component is rounded to the next highest multiple of 10 milliseconds. For example, if the wakeup period associated with a thread of an active advertisement component is 8 milliseconds, this wakeup period is rounded up to 10 milliseconds. However, if the wakeup period associated with the thread is 38 milliseconds, this wakeup period is rounded up to 40 milliseconds. In this way, the wakeup periods of the threads associated with the active advertisements is synchronized together and generally increased. As such, the total number of wakeups for the plurality of active advertisement threads is reduced over a given time period.

In other embodiments, the wakeup period for those threads identified as being associated with active advertisement components may be synchronized based on a wakeup period range in block 218. That is, the wakeup period for each thread associated with an active advertisement component may be converted to a wakeup period range during which the thread may be woke up at any time so as to provide flexibility to the client 102 in synchronizing the wakeups of the threads. For example, in one embodiment, a wakeup range length value is determined. The wakeup range length value identifies the length of the wakeup period range (e.g., a 100 millisecond range). In such embodiments, the wakeup period for each thread is converted to wakeup period range by adding the wakeup range length value to the wakeup period. For example, the wakeup range length value may be set to 100 milliseconds. If so, the wakeup period for each thread associated with an active advertisement component is converted to wakeup period range, which extends from the wakeup period value to the wakeup period value plus 100 milliseconds. For example, if the wakeup period associated with a thread of an active advertisement is 8 milliseconds, the wakeup period is converted to a wakeup period range from 8 milliseconds to 108 milliseconds.

In the above example, when a wakeup period of one of the threads associated with an active advertisement component expires, the client 102 examines the wakeup periods of the remaining threads associated with active advertisement components and wakes up those threads having wakeup timers (i.e., the time lapse since the last wakeup for that particular thread) within their associated wakeup period range. As such, when a wakeup period of one thread expires, the client 102 wakes up that particular thread along with additional threads having timers within their associated wakeup range. In this way, the wakeups of the threads associated with active advertisement components are synchronized. Additionally, if client 102 receives a wakeup request for other services (e.g., the user moves the mouse around, selects a key on the keyboard, etc), the client 102 may also wake up those threads having wakeup timers within their associated wakeup period range in response to the wakeup request. In this way, the wakeup periods of the threads associated with the active advertisement components are synchronized to each other as well as the original wakeup request (e.g., the wakeup request in response to the user moving the mouse).

while the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. A method comprising:
   downloading a web page from a remote source over a network using a client computer, the web page including a plurality of active web page components;
   initiating a thread on the client computer for each active web page component of the plurality of active web page components, each thread having an associated wakeup period;
   identifying a plurality of active advertisements from the plurality of active web page components; and
   synchronizing the wakeup periods of each thread associated with an active advertisement of the plurality of active advertisements.

2. The method of claim 1, wherein downloading the web page from the remote source comprises downloading a plurality of active web page components, at least one of the active web page components including animation.

3. The method of claim 1, wherein identifying the plurality of active advertisements comprises:
   retrieving a set of pattern matching rules from a server over the network, and
   comparing the pattern matching rules to a uniform resource locator associated with each active web page component of the plurality of active web page components.

4. The method of claim 3, wherein the set of pattern matching rules includes keywords.

5. The method of claim 3, wherein the set of pattern matching rules includes an address of a remote computer.

6. The method of claim 1, further comprising determining a minimum wakeup period.

7. The method of claim 6, wherein synchronizing the wakeup periods of each thread associated with an active advertisement comprises rounding the wakeup period of each thread associated with an active advertisement to the next highest multiple of the minimum wakeup period.

8. The method of claim 1, further comprising determine a wakeup period range for each thread associated with an active advertisement.

9. The method of claim 8, wherein determining a wakeup period range comprising:
   determining a wakeup range value, and
   determining a wakeup period range for each thread associated with an active advertisement, each wakeup period range having (i) a beginning value equal to the wakeup period of the associated thread and (ii) an ending value equal to the sum of the beginning value and the wakeup range value.

10. The method of claim 9, further comprising contemporaneously waking up at least two threads associated with an active advertisement, wherein each of the at least two threads has a wakeup timer within the wakeup period range of the associated thread.

11. The method of claim 10, wherein contemporaneously waking up at least two threads comprises contemporaneously waking up at least two threads associated with an active advertisement in response to the expiration of a wakeup period range associated with one of the at least two threads.

12. The method of claim 10, wherein contemporaneously waking up at least two threads comprises contemporaneously waking up at least two threads associated with an active advertisement in response to a wakeup request.

13. The method of claim 1, wherein synchronizing the wakeup periods of each thread associated with an active advertisement comprises identifying those threads associated with an active advertisement of the plurality of active advertisements.

14. The method of claim 1, wherein synchronizing the wakeup periods of each thread associated with an active advertisement comprises reducing the total number of wakeups over a predetermined period of time for each thread associated with an active advertisement.

15. A machine readable storage medium comprising a plurality of instructions, that in response to being executed, result in a computing device:
   retrieving a set of pattern matching rule from a server over a network, each keyword identifying a remote source of web page advertisements;
   downloading a web page from a remote source over the network, the web page including a plurality of active web page components;
   initiating a thread for each active web page component of the plurality of active web page components, each thread having an associated wakeup period;
   identifying a plurality of active advertisements from the plurality of active web page components using the set of pattern matching rules; and
   reducing the total number of wakeups for each thread associated with an active advertisement of the plurality of active advertisements over a predetermined time period.

16. The machine readable storage medium of claim 15, wherein the plurality of instructions further result in the computing device comparing the pattern matching rules to a uniform resource locator associated with each active web page component of the plurality of active web page components.

17. The machine readable storage medium of claim 15, wherein the plurality of instructions further result in the computing device synchronizing the wakeup periods of each thread associated with an active advertisement of the plurality of active advertisements.

18. The machine readable storage medium of claim 15, wherein the plurality of instructions further result in the computing device rounding the wakeup period of each thread associated with an active advertisement to the next highest multiple of a predetermined minimum wakeup period.

19. The machine readable storage medium of claim 15, wherein the plurality of instructions further result in the computing device:
   determining a wakeup range value, and
   determining a wakeup period range for each thread associated with an active advertisement, each wakeup period range having (i) a beginning value equal to the wakeup period of the associated thread and (ii) an ending value equal to the sum of the beginning value and the wakeup range value.

20. A computing device comprising:
   a processor; and
   a memory device having stored therein a plurality of instructions, which when executed by the processor, cause the processor to:
   download a web page from a remote source over a network, the web page including a plurality of active web page components;
   initiate a thread for each active web page component of the plurality of active web page components, each thread having an associated wakeup period;
   compare a set of pattern matching rules to a uniform resource locator associated with each active web page component of the plurality of active web page components;
   identify a plurality of active advertisements from the plurality of active web page components; and
   synchronize the wakeup periods of each thread associated with an active advertisement of the plurality of active advertisements.

* * * * *